United States Patent [19]

Chang et al.

[11] Patent Number: 4,510,567
[45] Date of Patent: Apr. 9, 1985

[54] QUALIFYING AND SORTING FILE RECORD DATA

[75] Inventors: Philip Y. Chang; John W. McInroy, both of Austin, Tex.

[73] Assignee: International Business Machines Corp., Armonk, N.Y.

[21] Appl. No.: 264,797

[22] Filed: May 18, 1981

[51] Int. Cl.³ .............................. G06F 7/00; G06F 7/24
[52] U.S. Cl. ..................................................... 364/300
[58] Field of Search ... 364/200 MS File, 900 MS File

[56] References Cited

U.S. PATENT DOCUMENTS

| | | | |
|---|---|---|---|
| 3,872,442 | 3/1975 | Boles et al. | 364/200 |
| 4,031,520 | 6/1977 | Rohner | 364/900 |
| 4,080,651 | 3/1978 | Cronshaw et al. | 364/200 |
| 4,101,968 | 7/1978 | Florence | 364/900 |
| 4,209,845 | 6/1980 | Berger et al. | 364/900 |
| 4,393,470 | 7/1983 | Miarn | 364/200 |
| 4,417,321 | 11/1983 | Chang et al. | 364/900 |

OTHER PUBLICATIONS

Software Tools in Pascal, Kernigan and Plauges published by Bell Labs. Inc. 1981 —Chapter 4.
An Operator Orientated Data Base Management System by J. Shapiro published in Kilobaud, Mar. 1980, p. 84.
Data Base Management by K. Widelitz published in Kilobaud, May 1979, p. 54.
Sorting Routines by Andrew J. Rerko, Kilobaud, Apr. 1977, pp. 34-36.

Primary Examiner—Gareth D. Shaw
Assistant Examiner—John G. Mills
Attorney, Agent, or Firm—Harold E. Meier

[57] ABSTRACT

Record data on a disk file is sorted in a text/data processor by means of an algorithm that transfers such records on the basis of rank to a sort buffer on the basis of qualifying criteria. Each qualified file record is compared with the lowest ranked record previously transferred and located in the sort buffer. When a higher ranked record is identified it is transferred into the buffer at a location based on qualification. Lower ranked records are deleted from the sort buffer if space does not permit the storing of such records within the space available. When the sort buffer has been loaded with the highest ranked records remaining in the disk file without overflowing the buffer is unloaded to an output device. The sort program recycles through a subsequent pass again transferring the highest ranked remaining records into the sort buffer. To minimize recycle time, a presort algorithm is run to set record identifying bits in a bit map section of the sort buffer. Each time the contents of the sort buffer is output the record identifying bits for the records in the sort buffer are reset to a second state. The second state of a record identifying bit indicates that that record will not be considered for future passes through the sort routine.

8 Claims, 8 Drawing Figures

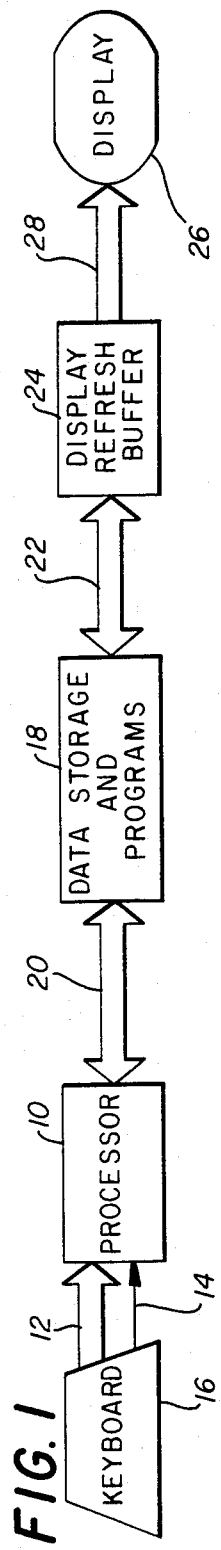
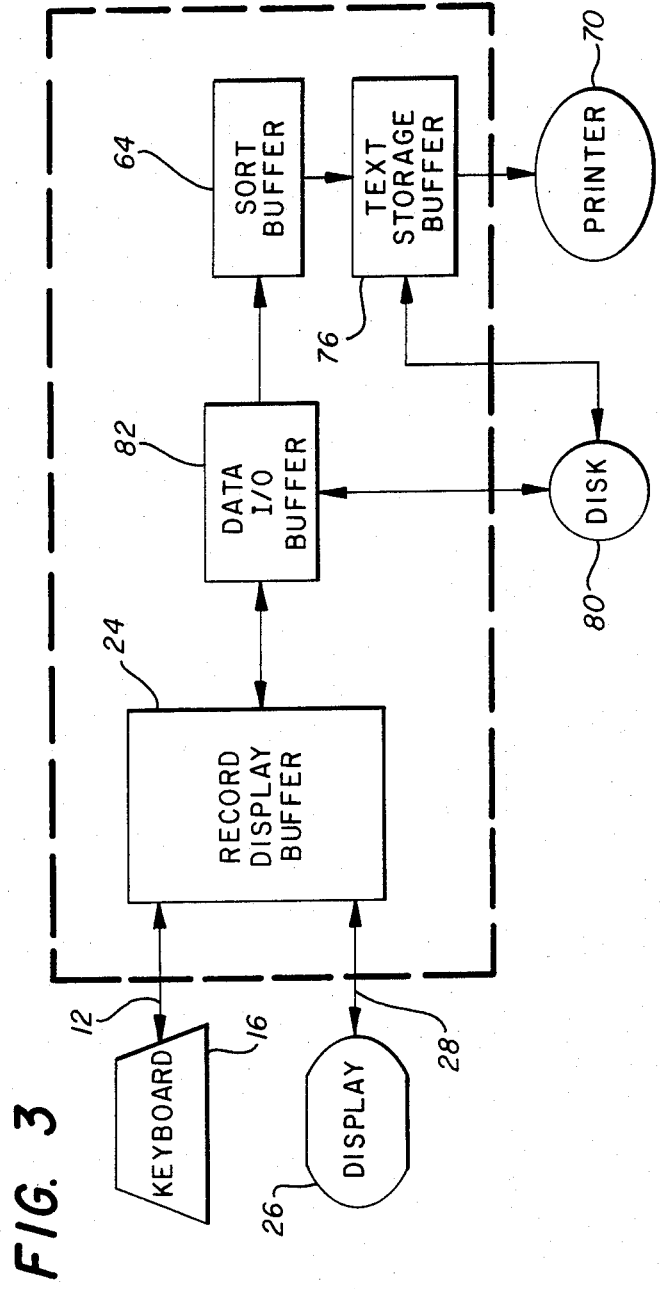

QUALIFYING AND SORTING FILE RECORD DATA

TECHNICAL FIELD

This invention relates to file record data handling in a text/data processing system, and more particularly to file record data sorting in a limited memory environment.

BACKGROUND ART

Office machines for processing text data to produce hard copies are being utilized with increasing frequency for data processing. Such text processing machines are physically structured to include all the necessary elements for data processing including a display screen for presenting to an operator a visual presentation of record data as it will appear on hard copy or be utilized by an output device. Typically, text processing machines incorporate a conventional typewriter keyboard with additional control keys for operator interface with the system controls. For data processing, operator instructions are input through the keyboard and displayed on a screen in a manner similar to the use of such machines for text processing. The display is segmented to allow datad formatting instructions to be presented to the operator along with a visual presentation of the data records being processed. Thus, the dispaly not only provides a visual presentation to the operator of the record data being processed, but also provides prompting instructions to allow interface with a text processing machine as a data operator.

Text processing machines on which data processing is carried out include electronic hardware programmed to evaluate operator keystrokes and to control the display. This electronic hardware includes memory for storing file format information and instruction data for future use for processing the file records for subsequent utilization or preparation of hard copy. Responding to the keystrokes of an operator are system controls including programmed computers which prepare the display screen for presenting to the operator file record data. Ease of operation of the machine for the operator is in large part determined by the electronics and associated computers and programs therefor.

Data processing on a text processing machine is achievable by utilization of algorithms with the machines's computers and memory. There are, however, several differences between the processing of text data and record data in a text processing machine. Typically, text is stored in an unstructured, but formatted, format while file records are stored in a structured, but unformatted manner. Text data is formatted in that it includes tabs, carrier returns, etc. Due to the fact that a data file can be fairly large, structuring of the included data permits rapid access to any particular portion. However, this requires programming to achieve this rapid access. To assist an operator in the accessing of file record etc, the system display screen in segmented into virtual displays or frames that includes grids to be filled in by an operator for processing of the file data. Through keying, an operator can then cause the stored record data to be qualified for keying "search" criteria.

File record data processing in text processing machines usually utilizes storage of the file record data on a disk. In the past, sorting of the data on the disk was carried out externally, that is, data was transferred from one disk to a second disk in a sort operation or sorting was completed in internal memory. With some earlier file record data processing in a text processing machine, a disk access is needed for the sorting of each record which is too cumbersome and time consuming.

Sorting of data is one of the most utilized functions of a text processing machine as a data processor and it thus becomes important to provide efficiency and ease of operator interface of the sorting function.

DISCLOSURE OF THE INVENTION

According to the present invention, data sorting is achieved by use of a sort buffer for temporarily storing qualified file records. Typically, the sort buffer may be a random access memory having, for example 40 K-bytes of storage. Only qualified records are stored in the sort buffer after being qualified on the basis of one of more search fields. The process of the present invention minimizes the need for a large amount of memory space sufficient to store an entire file, or as an alternative, to use a disk work space to store intermediate results.

To provide file data sorting on the basis of qualifying fields, file data (for example, as stored on the disk) is sequentially loaded into a sort buffer based on specified qualifications and sort criteria. The file data is transferred from the disk to the sort buffer until the buffer cannot accept the next qualified record. However, the file data in th sort buffer is not utilized at this time but instead, the remainder of the file is read and evaluated for comparison against file data previously transferred to the sort buffer. During this reading operation, records of a higher ranking replace records of a lower ranking previously transferred to the sort buffer. Upon completion of a reading of all of the file data, a register is set to identify the lower ranked record in the sort buffer and the contents of the buffer are stored or printed. The buffer is cleared for accepting additional records.

The above operation is repeated beginning with the lowest ranked record in the previous operation and continuing until the sorting of the record data file is complete. That is, for each pass the sort buffer is loaded with the best available record file data and the contents are stored or printed. The operation resumes at the lower ranked record previously transferred to the buffer.

In addition to removing the requirement for disk work space, the record data file procesing of the present invention enables the utilization of different size sort buffers. Where high speed sorting is required to sort buffer with greater storage space will provide such faster sorting. The larger the sort buffer, the fewer passes that would be required througha file to sort each record on a selected equalification criteria. Thus, a large buffer enables fast sorting and a buffer of more restricted space will provide corresponding slower sorting. An operator of a text processing machine has some control over the speed of sorting by utilization of extra sort buffer space with the process of the present invention.

In accordance with the present invention, there is provided a method of sorting file record data in a storage means for temporary retention in a sort buffer in an order based on selected ranking criteria; the method comprises the steps of: (a) ranking each file record in the storage means as to an order of preferential arrangement in the sort buffer; (b) next the process compares a file record in the storage means on the basis of ranking criteria with the lowest ranked file record previously transferred to the sort buffer. A compared file record in the storage means is transferred to unused space in the sort buffer and is located at a level based on ranking, that is, a higher ranked record will displace downward in the bufferd a lower ranked record.

When the sort buffer has been previously loaded to capacity, a higher ranked file record in the storage means will be transferred into the sort buffer and a lower ranked record will be deleted. Again, the file record transferred to the sort buffer will be located at a position depending on its ranking. When the sort buffer has been filled with the highest ranked file records in the storage means still available for sorting, then a register is set to identify the lowest ranked record in the buffer. The buffer is then cleared for storage or printing. The process recycles starting at the record having a ranking one position lower than the last record in the buffer previously transferred for storage or printing.

BRIEF DESCRIPTION OF THE DRAWINGS

A more complete understanding of the invention and its advantages will be apparent from the specification and claims and from the accompanying drawings illustrative of the invention.

Referring to the drawings:

FIG. 1 is a basic block diagram of a text/data processing system including a keyboard, processor, memory storage and a display screen for visual presentation to an operator of text data and operating or prompting instructions;

FIG. 3 is a detail showing the formatting of the storage of the system of FIG. 1 as structured for data processing;

DETAILED DESCRIPTION

Figure 2:
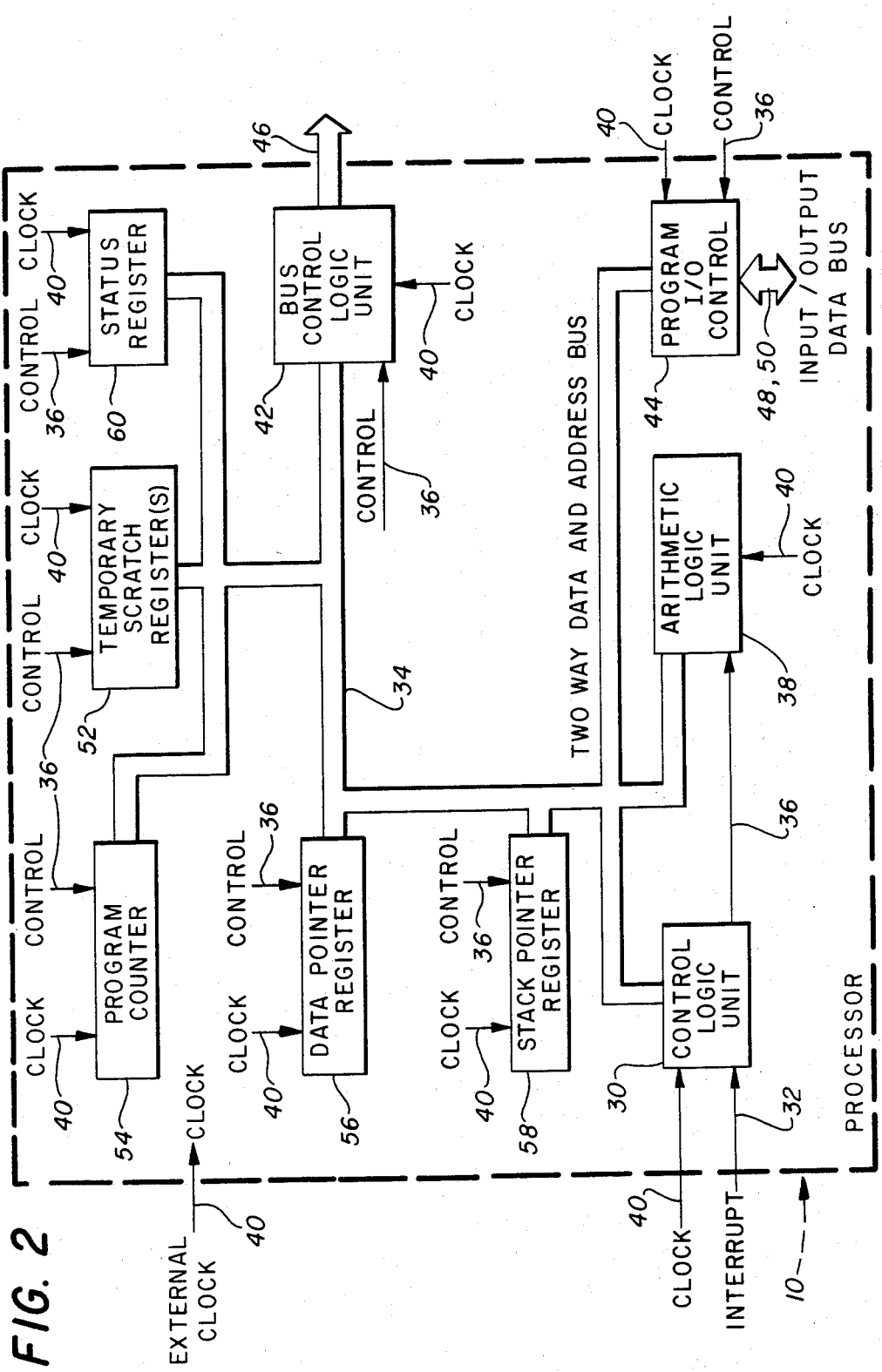
FIG. 2 is a bock diagram showing logic hardware detail of the processor of FIG. 1 with interconnecting control and data bus paths.

Referring to FIG. 1, a text and data processing system is shown including a processor 10, interconnected by means of a data bus 12 and control lines 14 to a keyboard 16. Included on the keyboard are conventional alpha-numeric characters found on the standard typewriter keyboard. In addition the keyboard includes symbol keys, such as backspace, carrier return and tab settings along with function keys used to instruct the system to perform certain operations, to control the way a display is created, or to provide information about stored textual and/or record data. In addition, the keyboard includes code keys that are used in conjunction with another key to input special instructions to the processor 10.

Keystroke data transferred to the processor 10 over the data bus 12 in the form of 7-bit bytes is processed by instructions stored in a random access memory 18 by means of an inteconnecting data bus 20. The random access memory 18 stores the keystroked data bytes, and file record data in addition to instructions for operation of the processor 10.

Also connected to the random access memory 18 by means of a data bus 22 is a display refresh buffer 24 that receives display data for formatting a visual presentation on a display screen 26. Control signals for operation of the display screen 26 ar provided along a data bus 28.

Typically, the display screen 26 is a cathode ray tube, in a preferred embodiment of the present invention, was formatted into multiple virtual images, the major one of which displayed twenty lines of text or data information. The total line capacity of the display was twenty-five lines with the first line reserved as a virtual display for document formatting information and the bottom two lines of the display reserved for virtual images as a prompt line and a message line to give an operator instructions on the control of the text/data processing system of FIG. 1.

Referring to FIG. 2, the processor 10 is further detailed to show typical logic hardware elements as found in such processors. The processor may be a commercially available unit, such as from Intel Corporation and identified by the Number 8086. Typically the processor includes a control logic unit 30 which responds to interrupts on a device bus 32 from the keyboard 16. The control logic unit 30 is also connected to the datad and address bus 34 interconnected to various other logic units of the processor 10.

In response to a fetch instruction from the random access memory, the control logic unit 30 generates control signals to other logic elements of the processor. These control signals are interconnected to the various elemens by means of a control line 36 which is illustrated directly connected to an arithmetic logic unit 38 and identified as a "control" line 36 to other elements of the processor. Synchronous operation of the control unit 30 with other logic elements of the processor 10 is achieved by means of clock pulses input to the processor from an external clock source. This instruction bus is also shown interconnected to othe logic elements of the processor detailed on FIG. 2.

Data and instructions to be processed in the processor 10 are input through a bus control logic unit 42. Data to be processed may also come from program input/output control logic 44. The bus control logic 42 interconnects storage elements of the random access memory 18 and receives instructions for processing data received from the input/output control 44 or received from the random access memory. Thus, the input/output control 44 receives data from the keyboard 16 or the random access memory 18 while the bus control logic 42 receives instructions and/or data from the same memory. Note that different storage sections of the random access memory are identifiable for program storage and data storage.

Device control information from the processor 10 is output through the program input/output controller 44 over a data bus (12, 20). Input data on the data bud (12, 20) from the keyboard 16 is processed internally through the processor by instructions on the bus 34 to the status register 60. The arithmetic logic unit 38 in response to a control signal on line 36 and in accordance with instructions received on the memory bus 46 performs arithmatic computations which may be stored in temporary scratch registers 52. Various other transfers of data betwen the arithmetic logic unit 38 and other logic elements of the processor are of course possible. Such additional transfers may be to a status register 60, a data point register 56 or a stack pointer register 58. Also in the data stream for these various logic elements by means of the bus 34 is a program counter 54.

A particular operating sequence for the processor 10 is determined by instructions and data on the memory bus 46 and input data on the bi-directional bus (12, 20). As an example, in response to received instructions, the processor transfers data stored in the scratch registers 52 to one of the registers 56, 58 or 60. Such operations of processors as detailed in FIG. 2 are considered to be well known and understood by one of ordinary skill in the data processing field. A detailed description of each operation of the processor of FIG. 2 for the described invention would be counterproductive to an understanding of the invention as claimed.

Referring to FIG. 3, there is shown a block diagram of a typical operational format of the system of FIG. 1 for data processing and includes the keyboard 16 connected by way of a data bus 12 to the record display buffer 24. Also connected to the record display buffer 24 is the display 26 by means of the data bus 28. As formatted, the data processing system includes a printer 70 and a disk drive 80, all external devices, connected to data storage bufers enclosed within the dotted outline. It should be understood that each of the identifiable areas of buffer storage within the dotted outline comprise storage locations addressable by conventional techniques. Thus, keystrokes from the keyboard 16 are received by the display buffer 24 over the data bus 12.

Stored within memory of the system are application programs consisting of instructions and data bytes transferred between the various buffers including the display buffer 24, a sort buffer 64, a text storage buffer 76, and a data input/output buffer 82. As the same implies, the next storage buffer 76 contains a data stream of data for processing in accordance with the present invention.

The text storage buffer interconnects by means of data lines to the printer 70 and the disk drive 80. Record data from the disk drive 80 is transferred through the data input/output buffer 82 into the sort buffer 64 as will be explained. Records properly sorted within the sort buffer 64 are transferred through the input/output buffer 82 through the display buffer 24 to the display 26 by means of the data line 28. This record data is also transferred through the text storage buffer 76 to the printer 70 where stored instructions direct the making of a permanent hard copy record.

By operation of the system of FIGS. 1–3 in conjunction with the processor 10, in the manner to be described with reference to FIGS. 4–18, a sorting of file record data is made for presentation on the display screen 26.

Figure 4:
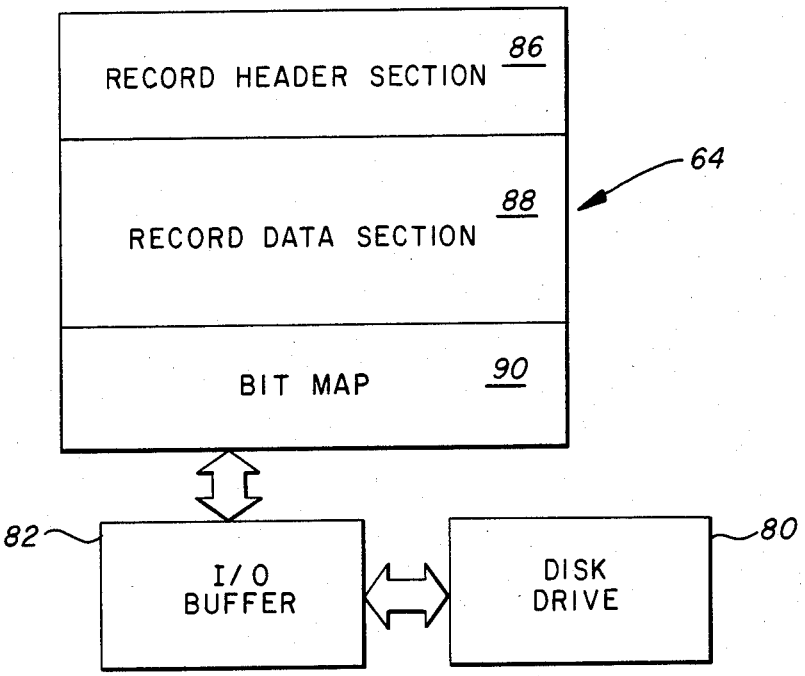
FIG. 4 is a block diagram showing data transfer and structuring of a sort buffer for receiving qualified data records.

Referring to FIG. 4, records to be sorted are stored on a disk which is inserted by the disk drive 80 for processing in accordance with a sort program previously stored. Stored on the disk along with a data record is the byte length of the record which information is required for sorting in accordance with the sorting program. Data records on the disk are sorted by evaluating one or more fields such as last name, zip code, and age. Typically, up to five fields are available for sorting data records. Each life record is read from the disk by the disk drive 80 and evaluated by the sort program and transferred through the input/output buffer 82 for storage in the sort buffer 64.

As configured, the sort buffer 64 includes a record header section 86, a record data section 88, and bit map section 90, the latter being explained with reference to FIG. 8. The record heater section includes a list of the length of each record in the data section 88 along with a pointer identifying the location of the record in the data section. While each entry into the header section 86 is of a fixed length, entries into the record data section vary with the length of the record transferred from the disk drive 80. In one embodiment on the invention, the sort program stores the record header bytes starting from the first portion of the record section 86 and locates the record data starting at the last position in the record section 88. This technique makes maximum use of the sort buffer size.

Figure 5:
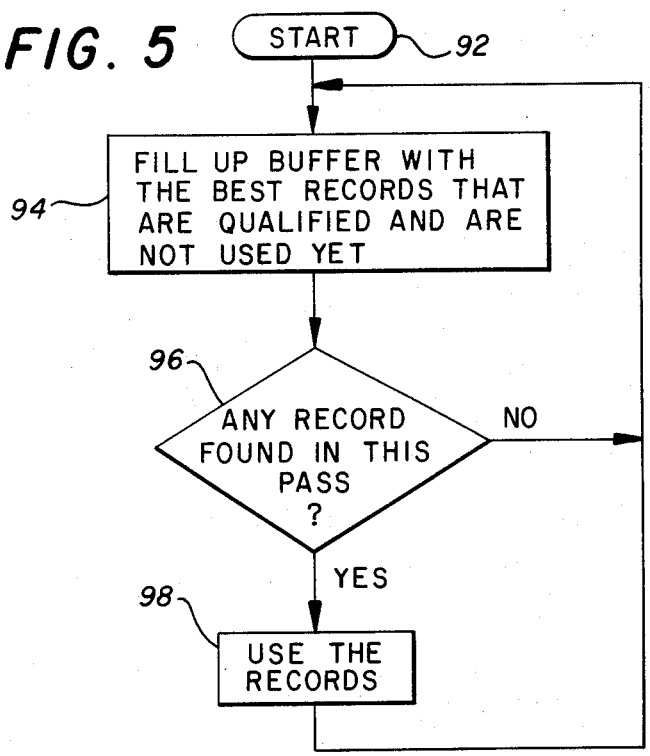
FIG. 5 is a high level flow chart for the basic algorithm for processing record data from a disk to the sort buffer on a record qualified basis.
Figure 6:
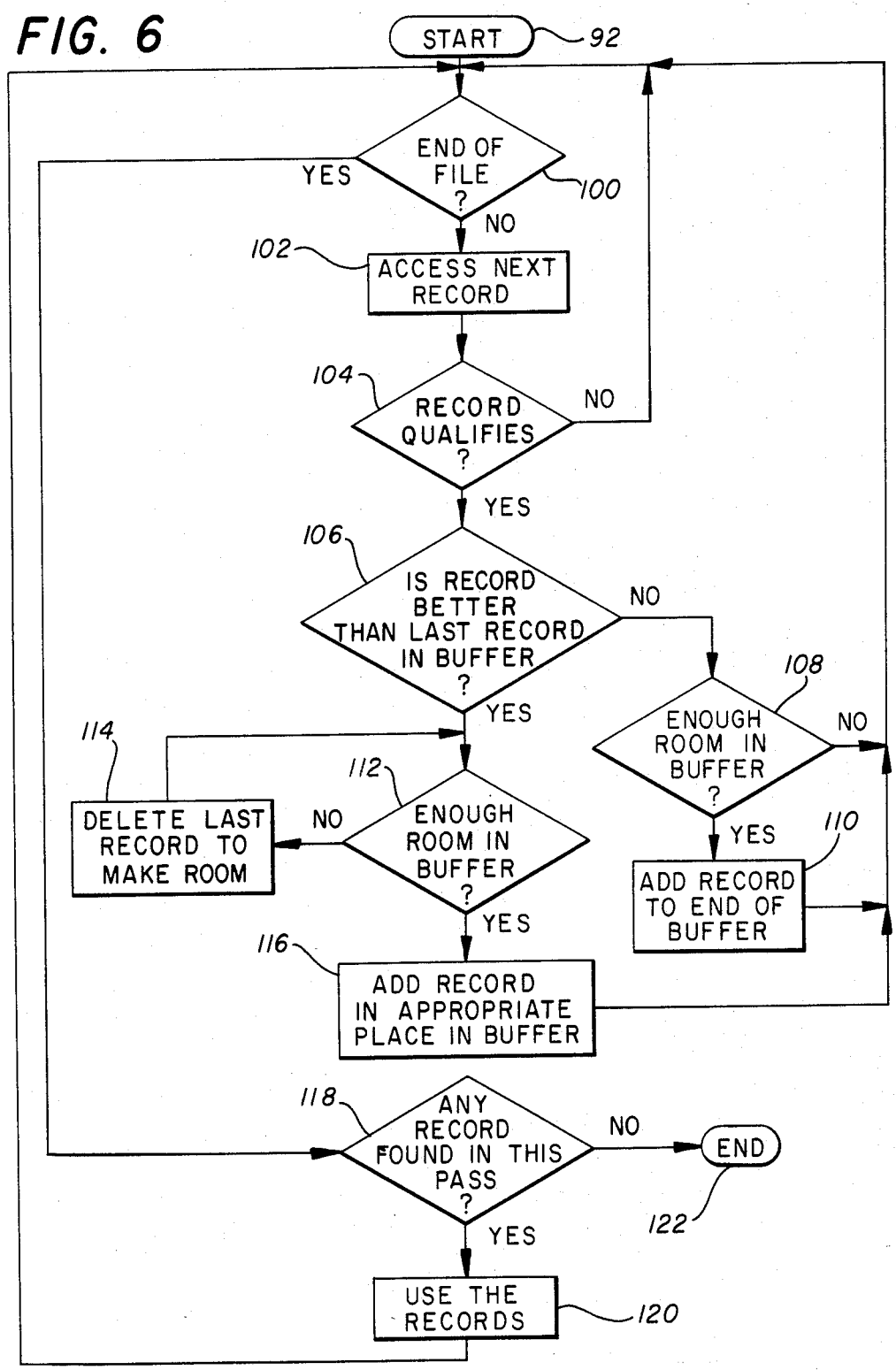
FIG. 6 is a more detailed flow chart of the basic algorithm as generalized in FIG. 5 showing the major functions for sorting file record data.
Figure 7:
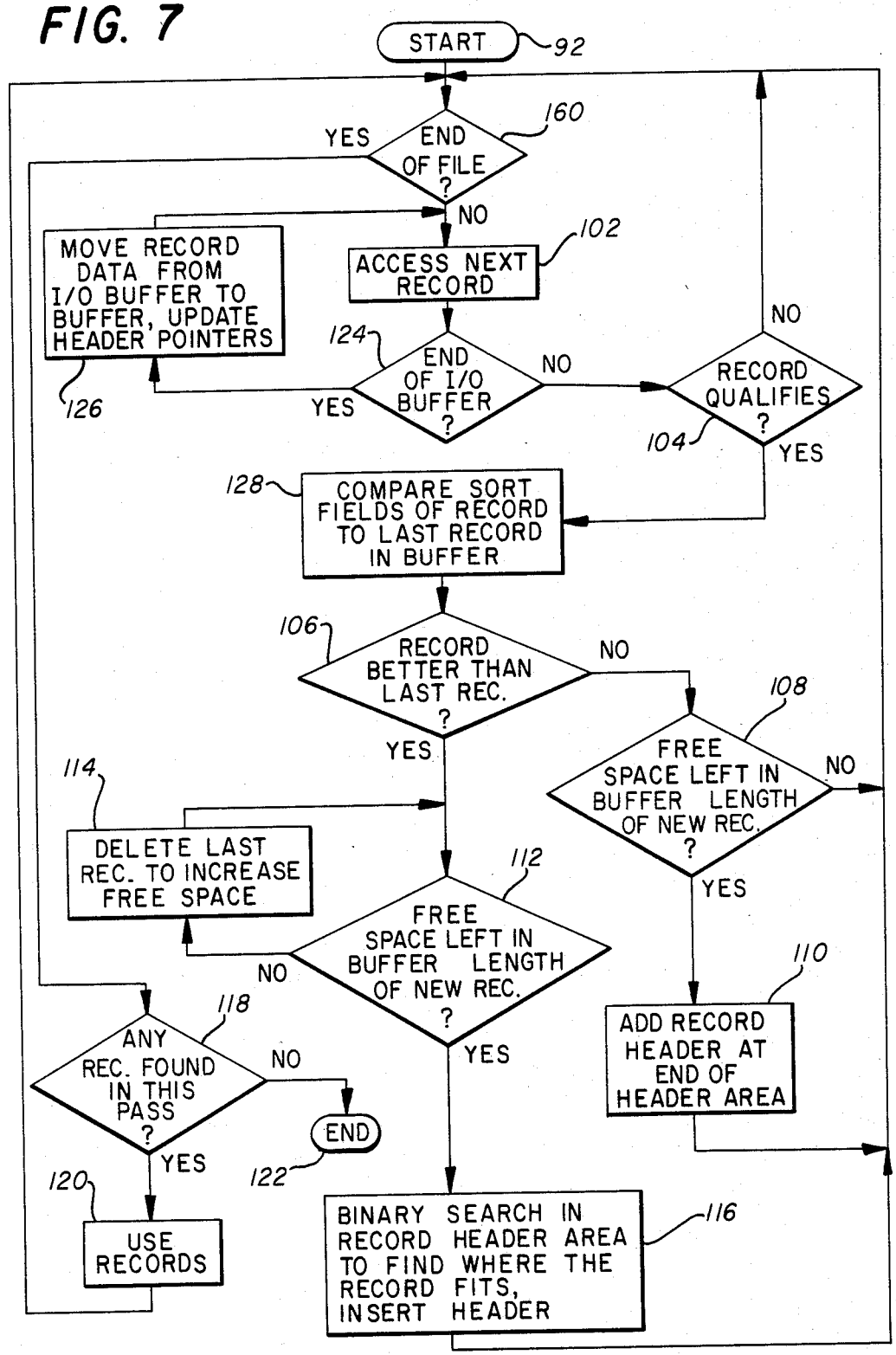
FIG. 7 is a detailed flow chart for qualifying, transferring and locating record data on a disk storage to a sort buffer for datad handling in the text/data processing system of FIG. 1.

The speed with which sorting of record data from the disk drive 80 is completed depends on the storage length of the sort buffer 64. The sort algorithm to be detailed with reference to FIGS. 5–7 is a multiple pass algorithm that continues to transfer record data into the data section 88 until the next stored record overflows the datad section. The records sorted and stored in the data section 88 are then transferred out of the sort buffer 64 through the input/output buffer 82 to the display 26, or through the text storage buffer 76 to the printer 70, or for other use as appropriate. Thus, the larger the sort buffer, the fewer passes required of the sort program of clearing all records on a disk. Typically, the sort buffer varies from 8 K-bytes in length to 40 K-bytes which includes the three sections, 86, 88 and 90.

Referring to FIG. 5, after the processor 10 receives a signal that a disk has been inserted into the disk drive 80, the sort program starts at entry 92 and proceeds to run the sequence of steps to complete the process of block 94. That is, each data record on the disk is qualified for selection and ranked for sorting the arranging in the sort buffer 64. The first record accessed on the disk is transferred through the input/output buffer 82 to the first position in the data section 88. The header section 86 is also loaded with pointers identifying the record, the record length in bytes and the address of the record in the data section 88.

After this first record has been located in the data section 88, a test 96 is made by the sort program to determine if there are additional records on the disk that have not been sorted and processed to the data section 88. If additional records are remaining on the disk, then the program recycles to block 94 to evaluate the next record on the disk. Ranking criteria of the next record is compared with ranking criteria of the previously transferred record to determine if it has a higher ranking or a lower ranking. For a record having a lower ranking than the previously transferred record, the data is transferred through the buffer 82 and located in the data section 88 at the next available storage location. Information for the next record is stored in the header section 86 which, as previously described, includes both record length and record location in the data section.

the algorithm recycles through 94 and 96 so long as there is a record on the disk that has not previously been transferred to the buffer 64. When the next record on the disk has ranking criteria with a higher level of ranking than previously transferred records, the next record will be transferred through the buffer 82 and located in the data section 88 below the next highest ranked record in the data section. All records in the data section 88 having a lower ranking are relocated in the data section. Thus, each time a record is located in the data section 88 having a higher ranking than previously transferred records, a reassembly of the data is required. For example, if the records are being sorted on last names, and records A, B, F, M, and R have been previously transferred to the data section 88 and the next record is sorted on the record D, then all records having a ranking lower than D will be shifted in the data section 88. The new arrangement will then be as follows: A, B, D, F, M, R.

The above description of the sorting process assumes that space remains in the data section 88 for all of the previously transferred records. For each transfer of a record into the sort buffer 64, an evaluation is made by the sort program to determine if additional byte space is available in the data section for storge of transferred records. If the next record to be transferred has a lower ranking then any previously transferred records and its length would cause in overflow of the data section 88, then this next record will not be transferred into the data section. It should be noted, however, that the sort program continues to evaluate each record on the disk to determine if one of higher ranking than previously transferred records remains. A record of a higher ranking, as explained, will replace a record of a lower rank. If the transferring of a record having a higher ranking causes the data section to overflow, then records of a lower rank will be deleted.

After the data section 88 has been filled to the extent possible without overflowing with the highest ranked records not previously sorted from the disk, the sort program makes the test 96 which results in an affirmative response and the program advances to a "use record" step 98 which outputs the record in the data section 88 to the disk 80 and also outputs the records to the printer 70 for producing hard copy. The data may also be used in other processes as required.

Referring to FIG. 6, there is shown in greater detail the sort algorithm as previously outlined in FIG. 5. The sort algorithm starts at entry 92 and completes a test 100 to determine if all the records on the disk have been processed for possible transfer into the data section 88. If the end of file test produces a negative result, then the algorithm advances to a step 102 to access the next record on the disk not previously sorted and transferred to the buffer 64 without subsequent deletion. The next record is evaluated at test 104 to determine if it qualifies for the sort program that is being run. That is, if the sorting is being made on last names beginning with the letters A through M and the next record is a last name beginning with the letter R, then the next record does not qualify for the sort and the sequence returns to the test 100. So long as the additional records are to be sorted from the disk the loop including 100, 102 and 104 recycles until a qualified record is found at test 104.

Upon location of a qualified record on the disk a test 106 is made to determine if the next record has a higher level of ranking than the last record located in the buffer 64. When the next record has a lower ranking than the last record located in the buffer then the test 106 produces a negative result and the sequence advances to a test 108 to determine if the next record will fit in the buffer 64 without overflowing the data section 88. If the length of the next record is in excess of the space available in the data section 88, then the sort sequence returns to the test 100.

The sequence including 100, 102, 104, 106 and 108 recycles each time the next qualified record has a lower level or ranking than the last record in the buffer 64 and the length of this record is greater than the space available in the data section 88.

When space is available in the data section 88 as determined by the test 108, then the sequence advances to a step 110 to transfer the next record through the buffer 82 into the data section 88. This next record is located following the last record stored in the data section. The identification, length and location of this record is also stored in the header section 86. After this next record has been added to the data section 88 at sequence step 110, the sort algorithm recycles to the "end of file" test 100.

When the next record has a higher ranking than the lowest ranked record in the buffer 64, the test 106 produces an affirmative result which advances the sequence to a test 112 to determine if sufficient byte space remains in the buffer 64 to accept the record under consideration. If the test 112 produces a negative response, the sequence advances to a step 114 which deletes the lowest ranked record from the buffer 64 and the processor recycles to the test 112. The sequence of test 112 and the step 114 are recycled, each time deleting the lowest ranked record from the buffer 64, until an affirmative result is produced at the test 112.

An affirmative result from the test 112 advances the sequence to a step 116 and the record which resulted in the affirmative result of the test 106 is added to the buffer 64 in the data section 88 with the record located in the sort order as determined by the sort algorithm. Following the location of this next record to the sort buffer 64 the sequence recycles to the "end of file" test 100.

The sequence of tests and steps 100, 102, 104, 106, 108, 110, 112, 114 and 116 is run until all the file records have been evaluated and the data section 88 has no more available byte space to accept the next qualified record on the disk. At this time the "end of file" test 100 produces an affirmative result and the sequence advances to a test 118. If any records are found to have been located in the data section 88 the test 118 produces an affirmative result advancing the sequence to a step 120 to configure the input/output buffer 82 to transfer the data record over the input/output bus to the disk 80 or other output device including the hard copy printer 70.

At the completion of the transfer of the records in the sort buffer 64 to the disk 80 or other output device, the sequence returns to test 100. The sequence starting at test 100 and continuing through step 116 is repeated for the next highest ranked records on the disk, that is, the next highest ranked following the lowest ranked record previously transferred from the buffer 64. The process as described above is recycled again loading the data section 88 with the highest ranked records still remaining on the disk. The test 118 and step 120 are again run and this next batch of records are transferred to the disk 80 or other output device. This recycle process continues until the test 118 produces a negative result indicating that on the previous pass no records were added to the data section 88 signifying that all records on the disk have been sorted. The sequence then steps to an "end" step 122 and the sort program shuts down the processor.

For a more detailed explanation of the sort process, reference is now made to FIG. 7. The flow chart of FIG. 7 adds additional detail to the flow chart of FIG. 6 and only such additional detail will be described with reference to FIG. 7. The sequence starts at entry 92 and after the test 100 the sequence advances to the "access next record" step 102 which is followed by a test to determine the condition of the input/output buffer 82. This test is made at 124. This sequence of the algorithm minimizes data movement between the disk drive 80 and the sort buffer 64 by loading the buffer 82 prior to transfer of data into the sort buffer. That is, file records from the disk drive 80 are batched into the input/output buffer 82 until this buffer is full. With the buffer 82 full, or not able to accept the next record, the test 124 produces an affirmative result and the sequence advances to a step 126 which moves all the data in the input/output buffer 82 into the sort buffer 64 as a batch.

The header section 86 is continuously updated with new pointers for the additional records being input and located into the data section 88. Note, that only those records having new pointers in header section 86 are transferred to data section 88. Thus, not all records transferred into the buffer 82 are subsequently transferred to the section 88. Those records not transferred from the buffer 82 are deleted from the buffer 82.

After the data in the input/output buffer 82 has been transferred into the sort buffer 64 the test 124 produces a negative result of the test 104 advances the sequence to a step 128 which compares the sort fields of the next qualifying record on the disk with the sort fields of the lowest ranked record in the data section 88. It is during the running of this step that the location of the record is determined when transferred to the data section 88. After the level of ranking has been determined at the step 128, the sequence advances to the test 106 followed by the test 108 which evaluates if the free space left in the sort buffer 64 is greater than the length of the next qualifying record. As previously explained, a negative result recycles the sequence and a positive result adds the record at step 110 which also causes the sequence to recycle.

A positive result of the test 106 advances the sequence to the test 112 which determines if the free space left in the buffer 64 is greater than the length of the new record. If not, the step 114 is run to delete the last record to increase free space in the data section 88. When enough free space is made available in the data section 88 to accept the next qualifying record on the disk, the sequence advances through an affirmative route to the step 116 which makes a binary search of the data in the header section 86 to evaluate where the next record fits into the records previously transferred and located in the data section 88. Data identifying the record, its length, and its loction in the data section 88, are inserted into the header 86 during running of the step 116. The sequence then returns to the test 100. When the data section 88 can accept no more records from the disk the sequence advances through the affirmative route to the test 118 and the step 120 or the end 122.

Figure 8:
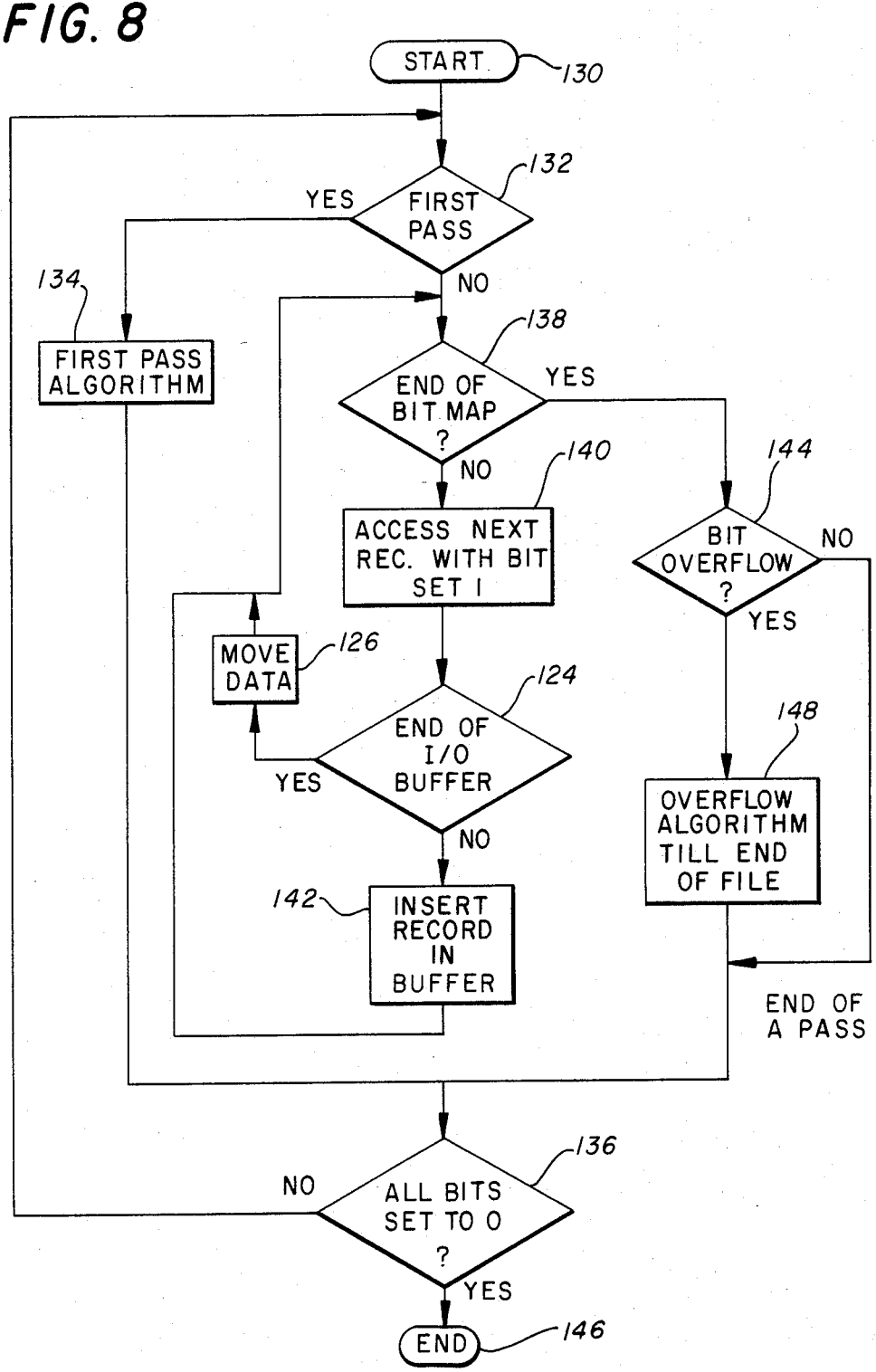
FIG. 8 is a flow chart of an algorithm for processing record data prior to sorting and transferring to a sort buffer as detailed by the flow chart of FIG. 7.

Referring to FIG. 8, there is shown a flow chart of an expansion of the basic sort algorithm of FIGS. 5-7 which provides increased sort efficiency. The algorithm of FIG. 8 can be considered a presort sequence and utilizes the bit map section 90 of the sort buffer 64. With the program of FIG. 8 loaded into the processor 10 along with the basic sort program of FIGS. 5-7, the sorting of records on a disk inserted into the disk drive 80 commences at a start 130. Note, where the flow chart of FIG. 8 incorportes tests or steps previously described the same reference number will be applied.

Following the start 130, a "first pass" test 132 is made to determine if the records on the disk have been previously qualified by a first pass algorithm. In the first pass through the file the records are qualified and the test proceeds along the affirmative path to the first pass algorithm 134 which is detailed in FIG. 7 and commences at the "access next record" step 102. The algorithm of FIG. 7 is completed for the first pass to identify qualified records on the disk. Note, that in order to select the qualified records all the records in the file must be evaluated and qualified. At the same time, a record identifying bit is set for each record in the bit map section 90 by sequencing the algorithm of FIG. 8 through the test 136 along the negative path back to the first pass test 132.

When all the record identifying bits in the bit map section 90 are set to a first state (a logic ONE) and the data section 88 no longer contains sufficient space to accept the next highest ranked record, the test 100 produces an affirmative result advancing the sequence through the test 118 and the "use record" step 120 or step to the end 122.

Upon completion of the first pass all the record identifying bits of the records in the data section 88 that have been read out for use in the disk 80, or other output device, will have been set to the first state and then reset to the second state (logic ZERO) indicating that the record has been sorted and need not be considered again for future passes through the disk file. All other records on the disk will have the record identifying bit set to the first state. Upon completion of the first pass the test 132 causes the sequence to proceed along the negative path to a test 138 to determine if additional first state bits are found in the section 90. If additional first state bits are available the negative path from the test 138 is followed to an "access record" step 140 which searches the disk file for the next record with the record identifying bit set to one, that is, the first state. Following identification of the next record with an identifying bit set to one, the test 124 is made which proceeds along the affirmative path to the "move record" step 126 and back to the "end of bit map" test 138.

If additional space remains in the buffer 64 the sequence of FIG. 8 advances to an "insert record" step 142 which begins at the comparison step 128 of FIG. 7 and follows the path there detailed. However, the negative path from the test 108 returns the sequence of FIG. 8 to the "end of bit map" test 138 as does a completion of the "add record" step 110 and also a completion of the binary search step 116. Thus, the "insert record" step 142 includes comparision of the header data in the header section 86 and space management of the sort buffer 64 as previously described. Note, that during the pass of the sequence through the step 140 all those records that have the record identifying bit set to zero, that is, the second state, will be bypassed thereby reducing the number of records that must be evaluated for transfer to the data section 88 of the buffer 64.

Following the running of step 142, each time the data section 88 includes the most qualified records remaining in the disk file having a record identifying bit in the first state, the sequence including test 118 and step 120 are run to output these records as previously described. The records thus transferred from the data section 88 will have the record identifying bit then set to zero, that is, the second state.

The sequence through path of test 138 and step 140 continues until all of the record identifying bits in the bit map section 90 are reset to the second state as shown by a positive result of the test 138. Following the positive path from the test 138 the sequence advances to a bit overflow test 144 which produces a negative result when the bit map section 90 had sufficient space to contain a record identifying bit for each record on the disk. Thus, the sequence from test 138 through step 140 continues for each bit in the bit map until the last bit has been checked.

With the last bit in the bit map section 90 checked and a negative result from the test 144 the sequence advances to the test 136 and if a record identifying bit in the map section 90 is in the first state, that is, a one, then the program recycles to the first pass test 132 and again takes up at the "end of bit map" test 138. This sequence continues until all the record identifying bits have been set to zero advancing the program through the test 136 along the affirmative path to the end 146. At this time all the qualifying records on the disk have been sorted through the sort buffer 64 and output to the disk 80 or other output device.

When the number of records to be sorted is greater than the space available for record identifying bits in the map section 90, the first pass algorithm 134 will be run as previously described with one exception. That is, when the last record identifying bit is located, and more than one record remains on the disk, all remaining records will be assigned to the last record identifying bit. After the first pass the test 132 advances the sequence to the test 138 which inserts records into the data section 88 as previously explained through step 140, test 142, step 126 and step 142.

When all of the record identifying bits in the bit map section have been reset to the second state as determined by the test 138 the overflow test 144 is made which, when the overflow bit has been set, will produce a positive result advancing the presort algorithm to a step 146. Step 146 resets the processor to run the program of FIG. 7 for each record covered by the overflow bit. The algorithm of FIG. 7 is run until the "end of file" test 100 produces a positive response thereby advancing the sequence to the test 136 which recycles the algorithm of FIG. 8 to the first pass test 132.

After all the records assigned to the overflow bit have been evaluated for sorting and the data section 88 loaded with the highest ranked records the algorithm follows through the path of tests 132 and 138, through the step 140, again sorting records assigned identifying bits. Again the test 144, and the step 146 are completed for records in the overflow bit. The presort program then continues until all the records in the disk file have been sorted into the buffer 64 and transferred to an output device.

Each of the tests and steps of the algorithms as illustrated by the flow charts of FIGS. 7 and 8 is also described by the psuedocode of the following table. The psuedocode is a list of each instruction for running the sort and presort algorithms on the test/data processing machine of FIG. 1.

TABLE I

| - PSEUDOCODE - | |
|---|---|
| BEGIN (GET NEXT SORTED RECORD) | 00022900 |
| 1. IF SORTING (RSOCNOST OFF) THEN | 00023000 |
| 2. . IF CALL IS NOT FIRST THEN | 00023100 |
| 3. . . IF ADVANCE IS FOR NEXT RECORD THEN | 00023200 |
| 4. . . . IF RECORD NOT ALREADY COLLECTED THEN | 00023300 |
|  | 00023400 |
|  | 00023500 |
| 5. . . . . INDICATE PREVIOUS RECORD PRINTED IN SORT MAP | 00023600 |
|  | 00023700 |
| 5. . . . . DECREMENT # HEADERS IN SORT BUFFER | 00023800 |
|  | 00023900 |
| 5. . . . . IF MORE RECORDS LEFT IN BUFFER THEN | 00024000 |
| 6. . . . . . INCREMENT TO NEXT RECORD | 00024200 |
| 5. . . . . ELSE EMPTY SORT BUCKET | 00024300 |
| 6. . . . . . DO COMPLETE PASS OF FILE - SORTING ANOTHER BUCKET FULL OF BEST RECORDS | 00024400 |
|  | 00024500 |
|  | 00024600 |
| 5. . . . . ENDIF | 00024700 |
| 4. . . . ELSE RE-ACCESS RECORD | 00024800 |
| 5. . . . . INCREMENT TO NEXT HEADER | 00024900 |
| 5. . . . . TURN OF RE-ACCESS INDICATOR | 00025000 |
| 5. . . . . DECREMENT NUMBER OF HEADERS | 00025100 |
| 4. . . . ENDIF RE-ACCESS | 00025200 |
| 3. . . ELSE PREVIOUS OR CURRENT | 00025300 |
| 4. . . . IF PREVIOUS RECORD THEN | 00025400 |
| 5. . . . . IF SORT NOT PREVIOUSLY TERMINATED THEN | 00025500 |
|  | 00025600 |
| 6. . . . . . POSITION TO PREVIOUS HEADER | 00025700 |
| 6. . . . . . INDICATE RE-ACCESSING OF CURRENT NEEDED | 00025800 |
|  | 00025900 |
| 6. . . . . . INCREMENT NUMBER OF HEADERS IN BUCKET | 00026000 |
|  | 00026100 |
| 5. . . . . ELSE SORT TERMINATED | 00026200 |
| 6. . . . . . TURN OFF TERMINATION TO ALLOW RECORD PASSING | 00026300 |
|  | 00026400 |
| 6. . . . . . POSITION TO LAST RECORD IN BUCKET | 00026500 |
|  | 00026600 |
| 5. . . . . ENDIF SORT PREVIOUSLY TERMINATED | 00026700 |
| 4. . . . ENDIF PREVIOUS | 00026800 |
| 3. . . ENDIF ADVANCE | 00026900 |
| 2. . ELSE CALL IS FIRST | 00027000 |
| 3. . . DO FIRST CALL INITIALIZATION - GETTING FIRST RECORD IF NOT | 00027100 |
|  | 00027200 |

TABLE I-continued

| | |
|---|---|
| SORTING | 00027300 |
| 3. . . IF SORTING THEN | 00027400 |
| 4. . . . DO COMPLETE PASS OF FILE - SORTING | 00027500 |
| BUCKET FULL OF BEST RECORDS | 00027600 |
| 3. . . ENDIF | 00027700 |
| 2. . ENDIF FIRST CALL | 00027800 |
| 1. ELSE NOT SORTING | 00027900 |
| 2. . DO NO SORT | 00028000 |
| 1. ENDIF SORTING | 00028100 |
| 1. IF TERMINATION FLAG IS OFF AND IF ERROR | 00028200 |
| FLAG IS OFF THEN | 00028300 |
| 2. . IF SORTING (RSOCNOST OFF) THEN | 00028400 |
| 3. . . DO PASS RECORD | 00028500 |
| 3. . . GET CURRENT RECORD ID (RSOCURID) | 00028600 |
| FROM HEADER (RSOHSRID) | 00028700 |
| 2. . ELSE NOT SORTING | 00028800 |
| 3. . . GET CURRENT RECORD ID (RSOCURID) | 00028900 |
| FROM FM (RFMCBCRN) | 00029000 |
| 2. . ENDIF SORTING | 00029100 |
| 2. . SET RETURN CODE SUCCESSFUL | 00029200 |
| 1. ENDIF TERMINATION | 00029300 |
| 1. SET FM EOB INDICATOR OFF | 00029400 |
| 1. RETURN TO CALLER | 00029500 |
| END (GET NEXT SORTED RECORD) | 00029600 |
| -END-PSEUDOCODE- | 00029700 |
| EJECT | 00029800 |
| | 00029900 |
| NOSORT - NO SORT | 00030000 |
| | 00030100 |
| | 00030200 |
| FUNCTION: FOR CONDITIONS WHERE SORTING IS NOT NEEDED, PROVIDE | 00030300 |
| LLPP LIST DIRECTLY FROM QUALIFY OR FILE MANAGER TO | 00030400 |
| SORTS INVOKER. | 00030500 |
| INPUT: DS - SOCB | 00030600 |
| ES - FMCB | 00030700 |
| | 00030800 |
| OUTPUT: DIRECTLY OR THROUGH LOWER ROUTINES, SETS UP OUTPUT | 00030900 |
| IN RSOCOVAL AND RSOCSVAL. | 00031000 |
| | 00031100 |
| NOTES: THIS ROUTINE PASSES RSOCRCFL FROM LOWER ROUTINES BACK TO | 00031200 |
| CALLING ROUTINE. | 00031300 |
| | 00031400 |
| INITIAL REWIND OF THE FILE IS CAUSED BY FIRST CALL TO | 00031500 |
| RQLGNQR IN A LOWER LEVEL ROUTINE. | 00031600 |
| | 00031700 |
| | 00031800 |
| - PSEUDOCODE - | 00031900 |
| BEGIN (NO SORT) | 00032000 |
| 1. SET FM EOB FLAT OFF | 00032100 |
| 1. IF OPTION IS TO ADVANCE AND NOT | 00032200 |
| RE-ACCESSING A RECORD THEN | 00032300 |
| 2. . CLEAR ALL RECORD ERROR CONDITIONS | 00032400 |
| (RSOCRCFL) | 00032500 |
| 2. . SAVE CURRENT RECORD ID | 00032600 |
| 2. . DO QUALIFY INVOKE TO GET NEXT RECORD | 00032700 |
| 1. ELSE CURRENT, PREVIOUS, OR RE-ACCESS | 00032800 |
| 2. . IF OPTION IS RE-ACCESS ADVANCE OR | 00032900 |
| PREVIOUS THEN | 00033000 |
| 3. . . IF RE-ACCESS ADVANCE THEN | 00033100 |
| 3. . . ELSE PREVIOUS | 00033200 |
| 4. . . . INDICATE CURRENT RECORD WILL BE | 00033300 |
| RE-ACCESSED | 00033400 |
| 4. . . . SAVE RECORD ID OF CURRENT RECORD | 00033500 |
| 3. . . ENDIF RE-ACCESS ADVANCE | 00033600 |
| 3. . . LOCATE RECORD | 00033700 |
| 3. . . IF RECORD ERROR THEN | 00033800 |
| 4. . . . ANALYZE THE RETURN CODE | 00033900 |
| 3. . . ENDIF RECORD ERROR | 00034000 |
| 2. . ENDIF RE-ACCESS OR PREVIOUS | 00034100 |
| 2. . IF NO ERRORS LOCATING RECORD THEN | 00034200 |
| 3. . . CALL RFMGFELD TO GET FIELDS OF | 00034300 |
| CURRENT RECORD | 00034400 |
| 2. . ENDIF NO ERRORS | 00034500 |
| 1. ENDIF CURRENT OPTION | 00034600 |
| 1. SET SEGMENT OF POINTERS (RSOCSPTR) = FM | 00034700 |
| SEGMENT OF POINTERS | 00034800 |
| 1. SET FIRST CALL INDICATOR OFF | 00034900 |
| END (NO SORT) | 00035000 |
| -END-PSEUDOCODE- | 00035100 |
| EJECT | 00035200 |
| | 00035300 |
| CMPPASS - COMPLETE PASS OF FILE | 00035400 |

TABLE I-continued

| | |
|---|---|
| | 00035500 |
| FUNCTION: CONTROL A SINGLE PASS OF THE FILE FROM BEGINING TO END. | 00035600 |
| RESET FLAGS, POINTERS AND REWIND BEFORE STARTING THE | 00035700 |
| PASS. CONTROL GETTING EACH RECORD, SORTING THE RECORD | 00035800 |
| AND HANDLING ERROR CONDITIONS. AT END OF THE PASS | 00035900 |
| RESET OVERFLOW FLAG IF ALL OVERFLOW RECORDS ARE | 00036000 |
| PROCESSED. | 00036100 |
| INPUT: | 00036200 |
| | 00036300 |
| | 00036400 |
| OUTPUT: RSOCURHD | 00036500 |
| RSOCNHDR | 00036600 |
| | 00036700 |
| NOTES: THIS ROUTINE IS CALLED ONLY WHEN SORTING IS REQUIRED. | 00036800 |
| | 00036900 |
| | 00037000 |
| | 00037100 |
| - PSEUDOCODE - | 00037200 |
| BEGIN (COMPLETE PASS OF FILE) | 00037300 |
| 1. INITIALIZE FOR SCANNING BIT MAP | 00037400 |
| 1. CLEAR ALL RECORD ERROR CONDITIONS | 00037500 |
| (RSOCRCFL) | 00037600 |
| 1. INVOKE FM TO REWIND FILE (RFMLUNQR) | 00037700 |
| 1. IF NOT A PERMANENT ERROR THEN | 00037800 |
| 2. . SET ADDITION INHIBIT FLAG OFF | 00037900 |
| 2. . SET EOB CONTROL BIT ON (RSOCCNTL) | 00038000 |
| 2. . SET FM EOB FLAG OFF INDICATING NOT TO | 00038100 |
| RETURN EOB | 00038200 |
| 2. . SET OVERFLOW PROCESSING FLAG OFF | 00038300 |
| (RSOCOVPR) | 00038400 |
| 2. . RESET PREVIOUS RECORD ID TO ZERO | 00038500 |
| 2. . IF OVERFLOW SORT THEN SAVE WORST CASE | 00038600 |
| PRINTED | 00038700 |
| 3. . . MOVE WORST CASE HEADER | 00038800 |
| 3. . . SAVE DATA VALUES | 00038900 |
| 3. . . UPDATE POINTERS TO NEW LOCATION | 00039000 |
| 2. . ELSE NO WORST CASE PRINTED TO BE SAVED | 00039100 |
| 3. . . SET END OF AVAILABLE SPACE | 00039200 |
| 2. . ENDIF | 00039300 |
| 2. . RESET BEGINING OF HEADER POINTER | 00039400 |
| 2. . RESET CURRENT HEADER POINTER | 00039500 |
| 2. . SET CURRENT BIT MAP POINTER TO | 00039600 |
| BEGINING OF MAP | 00039700 |
| 1. ELSE PERMANENT ERROR ON REWIND | 00039800 |
| 2. . SET ERROR FLAG ON | 00039900 |
| 1. ENDIF | 00040000 |
| 1. WHILE NOT A COMPLETE PASS OF FILE AND NO | 00040100 |
| RECORD ERROR CONDITIONS (EOF, | 00040200 |
| TERMINATION AND ERROR CAUSE LOOP | 00040300 |
| TERMINATION. EOB ALWAYS RESET) | 00040400 |
| 2. . IF EOB CONTROL BIT IS OFF THEN | 00040500 |
| 3. . . SET FM EOB INDICATOR ON (RFMCBEBP) | 00040600 |
| 2. . ENDIF | 00040700 |
| 2. . DO GET A RECORD | 00040800 |
| 2. . SET EOB CONTROL BIT OFF (RSOCCNTL) | 00040900 |
| 2. . IF RECORD FOUND THEN | 00041000 |
| 3. . . DO SORT LOGIC TO SORT THE RECORD | 00041100 |
| INTO THE BUCKET | 00041200 |
| 2. . ELSE RECORD ERROR | 00041300 |
| 3. . . IF EOB (RSOCEOBF) THEN | 00041400 |
| 4. . . . DO FM EOB TO PROCESS END OF BUF | 00041500 |
| 4. . . . SET FM EOB INDICATOR OFF | 00041600 |
| (RFMCBEBP) | 00041700 |
| 4. . . . SET EOB CONTROL ON (RSOCCNTL) | 00041800 |
| 4. . . . SET EOB FLAG OFF (RSOCEOBF) | 00041900 |
| 3. . . ELSE EOF, ERROR, OR TERMINATION | 00042000 |
| 4. . . . IF EOF (RSOCEOFF) THEN | 00042100 |
| 5. . . . . CHECK FOR END AND COPY FIELD | 00042200 |
| VALUES | 00042300 |
| 4. . . . ENDIF EOF | 00042400 |
| 3. . . ENDIF EOF, ERROR, OR TERM | 00042500 |
| 2. . ENDIF RECORD FOUND | 00042600 |
| 1. ENDDO NOT A COMPLETE PASS | 00042700 |
| 1. SET FIRST CALL FLAG OFF | 00042800 |
| 1. IF TYPE OF SORT IS OVERFLOW AND IF EOF | 00042900 |
| FLAG IS SET AND IF OVERFLOW CHECK | 00043000 |
| (RSOCOVCK) IS OFF THEN | 00043100 |
| 2. . SET OVERFLOW BIT IN BIT MAP OFF | 00043200 |
| 2. . RESET TYPE OF SORT TO BIT | 00043300 |
| 2. . FREE THE WORST CASE PRINTED SPACE | 00043400 |
| 1. ENDIF TYPE OF SORT | 00043500 |
| END (COMPLETE PASS OF FILE) | 00043600 |

TABLE I-continued

| | |
|---|---|
| -END-PSEUDOCODE- | 00043700 |
| EJECT | 00043800 |
| | 00043900 |
| FCALINIT - FIRST CALL INITIALIZATION | 00044000 |
| | 00044100 |
| FUNCTION: INITIALIZE THE SOCB AND SORT BUCKET ON THE FIRST PASS | 00044200 |
| OF THE FILE. DETERMINE OF SORTING IS REQUIRED. | 00044300 |
| IF NO SORTING THE GET FIRST RECORD. | 00044400 |
| | 00044500 |
| INPUT: DI - O | 00044600 |
| | 00044700 |
| | 00044800 |
| OUTPUT: RSOCNOST - SET ON IF NOT SORTING CASE | 00044900 |
| RSOCFORC - SET ON IF SORTING IS FORCED TO OCCUR | 00045000 |
| DI AND SI 0 | 00045100 |
| NOTES: | 00045200 |
| | 00045300 |
| | 00045400 |
| | 00045500 |
| - PSEUDOCODE - | 00045600 |
| BEGIN (FIRST CALL INITIALIZATION) | 00045700 |
| 1. IF NUMBER OF SORT FIELDS IS NON-ZERO AND | 00045800 |
| FIRST SORT FIELD NUMBER IS REC-ID AND | 00045900 |
| FIRST SORT ORDER IS ASCENDING AND | 00046000 |
| SPECIAL CASE DUPLICATE FLAG IS OFF | 00046100 |
| THEN | 00046200 |
| 2. . SET NUMBER OF SORT NUMBERS TO ZERO SO | 00046300 |
| SORT WILL NOT BE USED | 00046400 |
| 1. ENDIF | 00046500 |
| 1. IF SPECIAL CASE DUPLICATE (RSOCSPDP) AND | 00046600 |
| NO SORT SPECIFIED (RSOCNSOR) THEN | 00046700 |
| 2. . SET NUMBER OF SORT FIELDS TO ONE | 00046800 |
| 2. . SET FIRST SORT FIELD NUMBER TO REC-ID | 00046900 |
| 2. . SET FIRST SORT ORDER TO ASCENDING | 00047000 |
| 2. . SET FIRST SORT TYPE TO ARITHMETIC | 00047100 |
| 2. . SET FORCED SORT FLAG ON | 00047200 |
| 1. ENDIF | 00047300 |
| 1. SET NUMBER-OF-MOVES = NUMBER OF COMPLETE | 00047400 |
| FIELD NUMBERS (RSOCNCMP) | 00047500 |
| 1. SET DESTINATION TO START OF BUCKET | 00047600 |
| 1. SAVE START | 00047700 |
| 1. SET SOURCE OF LIST | 00047800 |
| 1. WHILE NUMBER-OF-MOVES NOT ZERO DO | 00047900 |
| 2. . MOVE FIELD NUMBER TO DESTINATION | 00048000 |
| 2. . INCREMENT TO NEXT DESTINATION | 00048100 |
| 1. ENDDO | 00048200 |
| 1. SET OFFSET OF COMPLETE LIST = OFFSET OF | 00048300 |
| BEGINNING OF SORT BUCKET | 00048400 |
| 1. SET SEGMENT OF COMPLETE LIST = SEGMENT | 00048500 |
| OF SORT BUFFER | 00048600 |
| 1. WHILE NUMBER OF SORT FIELD NUMBERS IS | 00048700 |
| NON-ZERO DO | 00048800 |
| 2. . SEARCH COMPLETE LIST FOR SORT FIELD | 00048900 |
| NUMBER UNTIL NUMBER FOUND OR END OF | 00049000 |
| LIST | 00049100 |
| 2. . IF FIELD NUMBER NOT FOUND THEN | 00049200 |
| 3. . . ADD NUMBER TO COMPLETE LIST | 00049300 |
| (RSOCOCMP, RSOCSCMP) | 00049400 |
| 3. . . INCREMENT NUMBER IN COMPLETE LIST | 00049500 |
| 2. . ELSE NUMBER LOCATED | 00049600 |
| 3. . . POSITION TO LOCATION | 00049700 |
| 2. . ENDIF FIELD NUMBER | 00049800 |
| 2. . SET RELATIVE POSITION IN RELATIVE LIST | 00049900 |
| (RESOCRELS) | 00050000 |
| 2. . INCREMENT TO NEXT SORT FIELD NUMBER | 00050100 |
| 1. ENDDO | 00050200 |
| 1. SAVE NUMBER IN COMPLETE LIST | 00050300 |
| 1. SET OFFSET OF FIELD VALUE LIST | 00050400 |
| (RSOCOVAL) = (NUMBER OF COMPLETE FIELD) | 00050500 |
| NUMBERS * LENGTH OF FIELD NUMBER) + | 00050600 |
| OFFSET OF COMPLETE FIELD NUMBER LIST | 00050700 |
| (RSOCOCMP) | 00050800 |
| 1. SET SEGMENT OF FIELD VALUE LIST TO | 00050900 |
| SEGMENT OF SORT BUCKET | 00051000 |
| 1. RESTORE ES TO FMCB | 00051100 |
| 1. IF NUMBER OF SORT FIELDS (RSOCNSOR) IS | 00051200 |
| NONZERO THEN | 00051300 |
| 2. . RESERVE SPACE FOR QUALIFY TO PASS BACK | 00051400 |
| LLPP LIST. THE FORMULA IS # FIELDS × | 00051500 |
| 4 BYTES | 00051600 |
| 2. . SET HEADER SIZE = SIZE OF HEADER | 00051700 |
| DESCRIPTOR (RSOHDSZ) + (NUMBER OF | 00051800 |

TABLE I-continued

| | |
|---|---|
| COMPLETE FIELD NUMBERS * LENGTH OF A | 00051900 |
| FIELD VALUE ELEMENT) | 00052000 |
| 2. . SET BEGINNING OF HEADERS (RSOCBEGH) = | 00052100 |
| (NUMBER OF COMPLETE FIELD NUMBERS * | 00052200 |
| LENGTH OF A FIELD VALUE ELEMENT) + | 00052300 |
| OFFSET OF FIELD VALUE LIST | 00052400 |
| (RSOCOVAL) | 00052500 |
| 2. . SET BEGINNING OF AVAILABLE SPACE | 00052600 |
| (RSOBEGA) = BEGINNING OF HEADERS | 00052700 |
| (RSOBEGH) | 00052800 |
| 2. . SET VALUE POINTERS TO SOCB | 00052900 |
| 1. ELSE NO SORT | 00053000 |
| 2. . SET NO SORT FLAG ON (RSOCNOST) | 00053100 |
| 2. . DO NO SORT | 00053200 |
| 1. ENDIF NO SORT | 00053300 |
| END (FIRST CALL INITIALIZATION) | 00053400 |
| -END-PSEUDOCODE- | 00053500 |
| EJECT | 00053600 |
| | 00053700 |
| PASSREC - PASS RECORDS | 00053800 |
| | 00053900 |
| FUNCTION: SET UP LLPP LIST BASED ON FIELD NUMBERS FOR CURRENT | 00054000 |
| REQUEST. SET REASON CODE TO LAST RECORD IN BUFFER | 00054100 |
| IF SPECIAL CASE DUPLICATE AND LAST RECORD IN BUFFER. | 00054200 |
| INPUT: DS - SOCB SEGMENT | 00054300 |
| RSOCURHD | 00054400 |
| | 00054500 |
| OUTPUT: LLPP LIST IS FORMED AT LOCATION RSOCOVAL | 00054600 |
| AH SET TO RSOCRSLT IF CONDITIONS MET FOR SP. CASE DUP. | 00054700 |
| | 00054800 |
| NOTES: CURRENT FIELD MEMBER MUST BE IN COMPLETE LIST | 00054900 |
| | 00055000 |
| | 00055100 |
| | 00055200 |
| - PSEUDOCODE - | 00055300 |
| BEGIN (PASS RECORD) | 00055400 |
| 1. SET POINTER TO FIRST POSITION IN FIELD | 00055500 |
| VALUE LIST | 00055600 |
| 1. WHILE NUMBER OF CURRENT FIELD NUMBERS IS | 00055700 |
| NON-ZERO DO | 00055800 |
| 2. . LOCATE LLPP WHICH CORRESPONDS TO THE | 00055900 |
| FIELD NUMBER IN THE CURRENT FIELD | 00056000 |
| NUMBER LIST | 00056100 |
| 2. . SET UP DESTINATION FOR SCAN | 00056200 |
| 2. . MOVE LLPP ENTRY INTO FIELD VALUE LIST | 00056300 |
| 2. . INCREMENT TO NEXT FIELD VALUE LIST | 00056400 |
| 1. ENDDO | 00056500 |
| 1. IF SPECIAL CASE DUPLICATE FLAG IS ON | 00056600 |
| (RSOCSPDP) AND RECORD IS LAST IN SORT | 00056700 |
| BUCKET THEN | 00056800 |
| 2. . SET REASON CODE = LAST RECORD REASON | 00056900 |
| CODE | 00057000 |
| 1. ENDIF SCP | 00057100 |
| END (PASS RECORD) | 00057200 |
| -END-PSEUDOCODE- | 00057300 |
| EJECT | 00057400 |
| | 00057500 |
| GETAREC - GET A RECORD | 00057600 |
| | 00057700 |
| FUNCTION: GET THE NEXT RECORD. IF THIS IS THE FIRST PASS OF THE | 00057800 |
| FILE, SET UP THE BIT MAP ELSE USE THE BIT MAP TO | 00057900 |
| DETERMINE WHICH RECORD TO EXAMINE NEXT. | 00058000 |
| INPUT: RSOCWORD, RSOCTWRD, RSOCXNUM, RSOCXWRD | 00058100 |
| | 00058200 |
| | 00058300 |
| OUTPUT: AX | 00058400 |
| RESOCRCFL IS PASSED FROM LOWER LEVEL ROUTINES | 00058500 |
| RSOCWORD, RSOCXNUM, RSOCXWRD | 00058600 |
| NOTES: RSOCXNUM IS RELATIVE TO ZERO BEGINING | 00058700 |
| | 00058800 |
| | 00058900 |
| | 00059000 |
| - PSEUDOCODE - | 00059100 |
| BEGIN (GET A RECORD) | 00059200 |
| 1. IF NOT FIRST CALL THEN | 00059300 |
| 2. . IF NOT PROCESSING AN OVERFLOW PORTION | 00059400 |
| 3. . . LOCATE NEXT BIT IN MAP WHICH IS ON | 00059500 |
| 3. . . IF FOUND THEN | 00059600 |
| 4. . . . CALCULATE RECORD NUMBER | 00059700 |
| 4. . . . IF RECORD IN ONE BIT PER RECORD | 00059800 |
| SECTION THEN | 00059900 |
| 5. . . . . IF RECORD NOT LOCATED NEXT TO | 00060000 |

TABLE I-continued

```
PREVIOUS RECORD THEN NOTE THAT                                    00060100
DX IS SOMETIMES ZERO DUE TO                                       00060200
RE-ACCESS                                                         00060300
6. . . . . . INVOKE FM LOCATE UNIQUE RECORD                       00060400
(RFMLUNQR)                                                        00060500
5. . . . . ELSE ADJACENT RECORDS                                  00060600
6. . . . . . INVOKE FM LOCATE NEXT RECORD                         00060700
(RFMLNXTR)                                                        00060800
5. . . . . ENDIF AJACENT RECORD                                   00060900
5. . . . . DO RCAQLFM TO ANALYZE RETURN                           00061000
CODE                                                              00061100
4. . . . ELSE OVERFLOW BIT                                        00061200
5. . . . . SAVE RECORD ID IN CASE EOB IS                          00061300
RECEIVED                                                          00061400
5. . . . . SET OVERFLOW PROCESSING ON                             00061500
5. . . . . SET OVERFLOW CHECK OFF                                 00061600
5. . . . . POSITION FM TO RECORD BEFORE                           00061700
OVERFLOW                                                          00061800
5. . . . . IF NO ERROR THEN                                       00061900
6. . . . . . DO OVERFLOW PASS TO FIND NEXT                        00062000
RECORD                                                            00062100
5. . . . . ELSE ERROR                                             00062200
6. . . . . . RESET OVERFLOW PROCESSING                            00062300
6. . . . . . INDICATE MUST TRY FOR RECORD                         00062400
AGAIN                                                             00062500
6. . . . . . ANALYZE THE RETURN CODE                              00062600
5. . . . . ENDIF NO ERROR                                         00062700
4. . . . ENDIF OVERFLOW BIT                                       00062800
3. . . ELSE NO BIT FOUND                                          00062900
4. . . . IF BUCKET IS EMPTY THEN                                  00063000
5. . . . . DO TERMINATION TO TERMINATE SORT                       00063100
4. . . . ELSE BUCKET HAS RECORDS                                  00063200
5. . . . . SET EOF FLAG ON (RSOCEOFF)                             00063300
4. . . . ENDIF BUCKET EMPTY                                       00063400
3. . . ENDIF BIT FOUND                                            00063500
2. . ELSE PROCESSING OVERFLOW RECORDS                             00063600
3. . . DO OVERFLOW PASS TO FIND NEXT RECORD                       00063700
2. . ENDIF BIT SORT                                               00063800
1. ELSE FIRST CALL                                                00063900
2. . DO QUALITY INVOKE TO GET NEXT RECORD                         00064000
2. . IF RECORD IS FOUND THEN                                      00064100
3. . . SET APPROPRIATE BIT ON                                     00064200
2. . ENDIF RECORD FOUND                                           00064300
1. ENDIF FIRST CALL                                               00064400
END (GET A RECORD)                                                00064500
-END-PSEUDOCODE-                                                  00064600
EJECT                                                             00064700
                                                                  00064800
SORT - SORT ANOTHER RECORD                                        00064900
                                                                  00065000
FUNCTION: GIVEN A QUALIFIED RECORD, DETERMINE WHERE THE RECORD    00065100
BELONGS IN THE BUCKET AND PUT THE RECORD HEADER IN                00065200
THE BUCKET IF APPROPRIATE.                                        00065300
INPUT: RSOCNHDR, RSOCADDI                                         00065400
DI - 0 SI - 0                                                     00065500
ES - FMCB DS - SOCB                                               00065600
OUTPUT: RSOCWCHD, RSOCADDI                                        00065700
                                                                  00065800
                                                                  00065900
NOTES:                                                            00066000
                                                                  00066100
                                                                  00066200
                                                                  00066300
- PSEUDOCODE -                                                    00066400
BEGIN (SORT LOGIC)                                                00066500
1. SET INSERT FLAG OFF                                            00066600
1. SET UP DESTINATION HEADER                                      00066700
1. IF BUCKET NOT EMPTY THEN                                       00066800
2. . DO COMPARE RECORD TO WORST CASE                              00066900
2. . IF BETTER THAN WORST CASE THEN                               00067000
3. . . SET INSERTION FLAG ON                                      00067100
2. . ENDIF BETTER                                                 00067200
2. . COMPUTE AVAILABLE SPACE                                      00067300
2. . IF RECORD HEADER WILL NOT FIT THEN                           00067400
3. . . SET ADD INHIBIT FLAG ON                                    00067500
3. . . IF INSERT FLAG ON THEN                                     00067600
4. . . . DO DELETE WORST CASE                                     00067700
3. . . ENDIF INSERT FLAG                                          00067800
2. . ENDIF RECORD FIT                                             00067900
2. . IF INSERT FLAG IS ON THEN                                    00068000
3. . . DO BINARY SEARCH TO FIND DESTINATION                       00068100
POINT                                                             00068200
```

TABLE I-continued

```
3... SHIFT HEADERS                                      00068300
3... SET DESTINATION FOR HEADER INSERT                  00068400
2.. ENDIF INSERT FLAG                                   00068500
1. ENDIF BUCKET EMPTY                                   00068600
1. IF INSERT FLAG IS ON OR IF ADD INHIBIT               00068700
IS OFF THEN                                             00068800
2.. DO PUT HEADER IN BUCKET                             00068900
2.. UPDATE WORST CASE POINTER                           00069000
2.. UPDATE BEGINNING OF AVAILABLE SPACE                 00069100
1. ENDIF                                                00069200
END (SORT LOGIC)                                        00069300
-END-PSEUDOCODE-                                        00069400
EJECT                                                   00069500
                                                        00069600
COPY - COPY FIELD VALUES FROM FM TO SORT BUCKET         00069700
                                                        00069800
FUNCTION: MOVE RECORD VALUES FROM THE FILE MANAGER BUFFER TO   00069900
THE SORT BUCKET.                                        00070000
                                                        00070100
INPUT:                                                  00070200
                                                        00070300
                                                        00070400
OUTPUT:                                                 00070500
                                                        00070600
                                                        00070700
NOTES:                                                  00070800
                                                        00070900
                                                        00071000
                                                        00071100
- PSEUDOCODE -                                          00071200
BEGIN (COPY FIELD VALUES)                               00071300
1. IF THERE ARE RECORDS TO COPY THEN                    00071400
2.. CHECK ROOM (ROOM NEEDED VS SPACE                    00071500
AVAILABLE)                                              00071600
2.. IF NOT ENOUGH ROOM THEN                             00071700
3... SET ADDITION INHIBIT FLAG ON                       00071800
3... UNTIL AVAILABLE SPACE GE NEEDED                    00071900
SPACE DO                                                00072000
4.... DO DELETE WORST CASE                              00072100
4.... COMPUTE AVAILABLE SPACE                           00072200
3... ENDDO                                              00072300
2.. ENDIF                                               00072400
2.. CALCULATE STARTING POINT BASED ON                   00072500
NEEDED SPACE                                            00072600
2.. WHILE THERE ARE RECORDS TO COPY DO                  00072700
3... IF DATA IS IN FM BUFFER THEN                       00072800
4.... MOVE ONE RECORD AT A TIME INTO                    00072900
SORT BUCKET                                             00073000
4.... DECREMENT NUMBER OF COPIES                        00073100
4.... INDICATE DATA NOW IN SORT BUCKET                  00073200
4.... CALCULATE EBCDIC VALUES OF RECORD                 00073300
ID'S                                                    00073400
4.... INCREMENT TO PREVIOUS HEADER                      00073500
3... ELSE DATA IN SORT BUCKET MUST BE                   00073600
MOVED                                                   00073700
4.... GROUP DATA TO BE SHIFTED WITHIN                   00073800
BUCKET                                                  00073900
4.... SHIFT SORT BUCKET DATA                            00074000
3... ENDIF                                              00074100
2.. ENDDO                                               00074200
1. ENDIF NUMBER                                         00074300
END (COPY FIELD VALUES)                                 00074400
RESET NEEDED SPACE TO ZERO                              00074500
-END-PSEUDOCODE-                                        00074600
EJECT                                                   00074700
                                                        00074800
FMEOB - FILE MANAGER OF BUFFER RETURN CODE              00074900
                                                        00075000
FUNCTION: POLL FOR END, AND REQUEST KEY. IF NEITHER THEN CONTROL   00075100
COPYING RECORD VALUES INTO THE SORT BUCKET.             00075200
                                                        00075300
INPUT:                                                  00075400
                                                        00075500
                                                        00075600
OUTPUT:                                                 00075700
RSOCERRF IS SET IF END RECEIVED (RSOCRCFL)              00075800
                                                        00075900
                                                        00076000
NOTES:                                                  00076100
                                                        00076200
                                                        00076300
                                                        00076400
```

TABLE I-continued

```
- PSEUDOCODE -                                                  00076500
BEGIN (FM EOB)                                                  00076600
1. CALL RFOKBPOL TO POLL FOR END AND                            00076700
REQUEST                                                         00076800
1. IF NO ERRORS THEN                                            00076900
2. . IF END KEY NOT FOUND THEN                                  00077000
3. . . DO COPY FIELD VALUES                                     00077100
3. . . IF SORT IS FORCED AND IF ADDITION TO                     00077200
BUCKET NOT ALLOWED AND IF BIT MAP                               00077300
ESTABLISHED THEN                                                00077400
4. . . . TERMINATE SEARCH FOR MORE RECORDS                      00077500
3. . . ENDIF                                                    00077600
2. . ELSE END KEY                                               00077700
3. . . SET RETURN CODE TO GLOBAL END                            00077800
3. . . INDICATE SORT ERROR                                      00077900
2. . ENDIF                                                      00078000
1. ELSE END KEY                                                 00078100
2. . SET ERROR FLAG ON                                          00078200
1. ENDIF NO ERRORS                                              00078300
END (FM EOB)                                                    00078400
-END-PSEUDOCODE-                                                00078500
EJECT                                                           00078600
                                                                00078700
CALLQUAL - CALL QUALIFY TO GET NEXT RECORD                      00078800
                                                                00078900
FUNCTION: CALL QUALIFY TO GET THE NEXT QUALIFIED RECORD. SET    00079000
UP THE INTERFACE TO QUALIFY BASED ON IF ITS THE FIRST           00079100
CALL OR IF NO SORTING IS REQUIRED.                              00079200
INPUT: RSOCGNQR                                                 00079300
                                                                00079400
                                                                00079500
OUTPUT: AX IS PASSED BACK IF ERROR FOUND                        00079600
RSOCGNQR                                                        00079700
                                                                00079800
NOTES: THIS ROUTINE PASSES RSOCRCFL FROM LOWER ROUTINES TO      00079900
CALLING ROUTINE.                                                00080000
                                                                00080100
                                                                00080200
- PSEUDOCODE -                                                  00080300
BEGIN (QUALIFY INVOKE)                                          00080400
1. IF FIRST CALL TO GNQR (RSOCGNQR OFF)                         00080500
THEN                                                            00080600
2. . SET GNQR INPUT TO NEXT                                     00080700
2. . SET GNQR FLAG TO NEXT (RSOCGNQR ON)                        00080800
1. ENDIF FIRST CALL TO GNQR                                     00080900
1. PASS THE INPUT INDICATOR                                     00081000
1. SET UP THE OUTPUT BUFFER                                     00081100
1. IF SORTING THEN                                              00081200
2. . SET INPUT LIST TO COMPLETE                                 00081300
1. ELSE NOT SORTING                                             00081400
2. . SET INPUT LIST TO CURRENT                                  00081500
1. ENDIF SORTING                                                00081600
1. PASS NUMBER OF FIELDS                                        00081700
1. INVOKE QUALIFY GET NEXT QUALIFIED RECORD                     00081800
(RQLGNQR)                                                       00081900
1. IF RETURN CODE NOT SUCCESS THEN                              00082000
2. . DO RCAQLFM TO ANALYZE THE RETURN CODE                      00082100
1. ENDIF RECORD NOT FOUND                                       00082200
END (QUALIFY INVOKE)                                            00082300
-END-PSEUDOCODE-                                                00082400
EJECT                                                           00082500
                                                                00082600
TERM - TERMINATION PROCESSING                                   00082700
                                                                00082800
FUNCTION: SET FLAGS BEFORE TERMINATING ALL SORTING.             00082900
                                                                00083000
                                                                00083100
INPUT:                                                          00083200
                                                                00083300
                                                                00083400
OUTPUT: AX                                                      00083500
RSOCTERM ON (RSOCRCFL)                                          00083600
                                                                00083700
NOTES:                                                          00083800
                                                                00083900
                                                                00084000
                                                                00084100
- PSEUDOCODE -                                                  00084200
BEGIN (TERMINATION)                                             00084300
1. SET TERMINATION FLAG ON                                      00084400
1. SET RETURN CODE                                              00084500
1. SET REASON CODE                                              00084600
```

TABLE I-continued

```
END (TERMINATION)
-END-PSEUDOCODE
EJECT

RCAQLFM - RETURN CODE ANALYSIS FOR QUALIFY AND FM

FUNCTION: ANALYZE THE RETURN CODES FROM GETTING A RECORD -
EITHER THE QUALIFY ROUTINE OR A FILE MANAGER ROUTINE.

INPUT: AX

OUTPUT: RSOCRCFL IS SET ACCORDING TO THE RETURN CODE

NOTES:           RETURN CODE CHART
```

|          | SUCCESSFUL | EOB | EOF | ERROR | END |
|----------|------------|-----|-----|-------|-----|
| RFMLUNQR | X          | X   |     | X     |     |
| RFMLNXTR | X          | X   | X   | X     |     |
| RQLGNQR  | X          | X   | X   | X     | X   |

```
- PSEUDOCODE -
BEGIN (RCAQLFM)
1. IF RETURN CODE/REASON CODE IS EOB THEN
2. . SET EOB FLAG ON (RSOCEOBF)
1. ELSE EOF, TERM, OR ERROR
2. . IF RETURN CODE/ REASON CODE IS EOF
THEN
3. . . IF NOT SORTING (RSOCNOST ON) OR IF
THE BUCKET IS EMPTY (RSOCNHDR
ZERO) THEN
4. . . . DO TERMINATION
3. . . ELSE RECORDS IN BUCKET
4. . . . SET EOF FLAG ON (RSOCEOFF)
3. . . ENDIF RECORDS IN BUCKET
2. . ELSE ERROR OR END
3. . . SET ERROR FLAG ON (RSOCERRF)
2. . ENDIF EOF
1. ENDIF EOB
END (RCAQLFM)
-END-PSEUDOCODE-
EJECT

OVERFLOW - PROCESS THE OVERFLOW RECORDS

FUNCTION: GET THE NEXT RECORD IN THE OVERFLOW PORTION OF RECORDS.
IF THE RECORD HAS ALREADY BEEN PASSED TO SORTS INVOKER,
THEN CONTINUE SEARCHING FOR A QUALIFIED RECORD.
INPUT:

OUTPUT:

NOTES:

- PSEUDOCODE -
BEGIN (OVERFLOW PASS)
1. SET OVERFLOW COMPLETION FLAG OFF
1. WHILE OVERFLOW COMPLETION OFF AND NO
ERROR DO
2. . DO QUALIFY INVOKE TO GET NEXT RECORD
2. . IF RECORD FOUND THEN
3. . . COMPARE RECORD TO WORST CASE PRINTED
3. . . IF PRESENT RECORD NOT PRINTED THEN
4. . . . SET OVERFLOW COMPLETION ON
4. . . . SET OVERFLOW CHECK ON
3. . . ENDIF
2. . ENDIF
1. ENDDO
END (OVERFLOW PASS)
-END-PSEUDOCODE-
EJECT

COMPARE - COMPARE TWO RECORDS
```

TABLE I-continued

```
FUNCTION: COMPARE TWO RECORDS TO DETERMINE THEIR ORDERING IN THE    00092700
FILE.                                                                00092800
                                                                     00092900
                                                                     00093000
INPUT: DS - SOCB SEGMENT                                             00093100
ES - FMCB SEGMENT                                                    00093200
BX - OFFSET TO HEADER FOR RECORD A                                   00093300
OUTPUT: AH - 1 MEANS B WORSE THAN A                                  00093400
4 MEANS B BETTER THAN A                                              00093500
                                                                     00093600
NOTES: TERMINOLOGY -                                                 00093700
RECORD A IS A RECORD IN THE SORT BUCKET. THIS                        00093800
ALSO MEANS THAT IF A AND B ARE EQUAL THAT                            00093900
A COMES BEFORE IN ORDER TO PRESERVE THE                              00094000
ORDERING OF THE FILE - A WAS EARLIER IN                              00094100
THE FILE THAN B.                                                     00094200
RECORD B IS THE RECENTLY FOUND RECORD. IT IS NOT                     00094300
NOT IN THE BUCKET. LLPP IS IN RSOCOVAL.                              00094400
LESS THAN MEANS THAT BASED ON THE SORT ORDER OF THE                  00094500
FIELDS, A LT B MEANS A SHOULD BE IN THE                              00094600
FILE BEFORE B.                                                       00094700
GREATER THAN MEANS BASED ON THE SORT ORDER OF THE                    00094800
FIELDS, A GT B MEANS A SHOULD BE IN THE                              00094900
FILE AFTER B.                                                        00095000
                                                                     00095100
NOTE - AH AS OUTPUT SHOWS THE RELATIONSHIP OF B TO A,                00095200
NOT A TO B AS USED IN THE COMPARISON ROUTINES.                       00095300
                                                                     00095400
NOTE - BX IS NOT CHANGED IN THIS SEGMENT.                            00095500
                                                                     00095600
                                                                     00095700
- PSEUDOCODE -                                                       00095800
BEGIN (COMPARE RECORDS)                                              00095900
1. UNTIL RECORDS NOT EQUAL OR ALL FIELDS                             00096000
COMPARED DO                                                          00096100
2. . IF FIELD TYPE IS CHARACTER THEN                                 00096200
3. . . INVOKE CHARACTER COMPARE                                      00096300
2. . ELSE ARITHMETIC                                                 00096400
3. . . INVOKE ARITHMETIC COMPARE                                     00096500
2. . ENDIF                                                           00096600
2. . INCREMENT TO NEXT SORT FIELD                                    00096700
1. ENDDO                                                             00096800
1. IF UNEQUAL FIELDS THEN                                            00096900
2. . IF ORDER OF UNEQUAL FIELDS IS                                   00097000
ASCENDING THEN                                                       00097100
·3. . . REVERSE THE SENSE OF A AND B                                 00097200
2. . ENDIF ORDER                                                     00097300
1. ELSE EQUAL                                                        00097400
2. . SET B TO WORSE THAN A                                           00097500
1. ENDIF UNEQUAL                                                     00097600
END (COMPARE RECORDS)                                                00097700
-END-PSEUDOCODE-                                                     00097800
EJECT                                                                00097900
                                                                     00098000
HEADER - PUT A HEADER IN BUCKET                                      00098100
                                                                     00098200
FUNCTION: FORM A HEADER AT THE DESIRED LOCATION IN THE SORT          00098300
BUCKET.                                                              00098400
                                                                     00098500
INPUT: DS - SOCB SEGMENT                                             00098600
ES - FMCB SEGMENT                                                    00098700
DI - DESTINATION FOR HEADER ADDITION/INSERTION                       00098800
OUTPUT:                                                              00098900
                                                                     00099000
                                                                     00099100
NOTES: SPACE FOR HEADER ALREADY PROVIDED                             00099200
                                                                     00099300
                                                                     00099400
                                                                     00099500
- PSEUDOCODE -                                                       00099600
BEGIN (PUT HEADER IN BUCKET)                                         00099700
1. FORM HEADER IN BUCKET AT DESTINATION                              00099800
1. TOTAL LL'S                                                        00099900
1. PUT TOTAL IN HEADER                                               00100000
1. UPDATE NEEDED SPACE FOR DATA (SUM = SUM                           00100100
+ TOTAL LL'S)                                                        00100200
1. INCREMENT NUMBER OF HEADERS IN SORT                               00100300
BUCKET                                                               00100400
1. INCREMENT NUMBER OF RECORDS TO COPY                               00100500
END (PUT HEADER IN BUCKET)                                           00100600
-END-PSEUDOCODE-                                                     00100700
EJECT                                                                00100800
```

TABLE I-continued

DELETE - DELETE THE WORST CASE

FUNCTION: DELETE THE WORST CASE FROM THE SORT BUCKET.

INPUT: RSOCWCHD

OUTPUT: RSOCBEGA, RSOCENDA, RSOCHDSZ, RSOCNHDR, RSOCNCPY, RSOCNEED

NOTES:

```
- PSEUDOCODE -
BEGIN (DELETE WORST CASE)
1. IF WORST CASE DATA IN SORT BUCKET THEN
2. . DELETE DATA BY MOVING POINTER
(RSOCENDA)
1. ELSE
2. . UPDATE NEEDED SPACE (SUM = SUM - TOTAL
LL'S)
2. . DECREMENT NUMBER OF HEADERS TO COPY
1. ENDIF WORSE CASE
1. DELETE WORSE CASE HEADER BY UPDATING
POINTER (RSOCBEGA)
1. DECREMENT NUMBER OF HEADERS (RSOCNHDR)
1. SET WORSE CASE POINTER TO PREVIOUS
RECORD
END (DELETE WORSE CASE)
-END-PSEUDOCODE-
EJECT
```

BINARY - BINARY SEARCH

FUNCTION: PERFORM A BINARY SEARCH OF THE RECORD HEADERS TO DETERMINE WHERE THE RECORD IN QUESTION IS TO BE PLACED. RETURN THE DESTINATION AS THE POINT WHERE THE NEW HEADER IS TO BE PLACED, ALL RECORDS AFTER THIS POINT ARE WORSE THAN THE CURRENT RECORD.

INPUT: DS - SOCB SEGMENT

OUTPUT: BX - OFFSET TO INSERTION POINT

NOTES: FOR BINARY SEARCH HANDLING, HEADERS ARE COUNTED FROM ORIGIN 1: FOR COMPUTING OFFSETS TO HEADERS, HEADERS MUST BE FORM ORIGIN 0

```
- PSEUDOCODE -
BEGIN (BINARY SEARCH)
1. SET LOW = 1
1. SET HIGH = NUMBER OF HEADERS IN BUCKET
1. WHILE LOW LE HIGH DO
2. . CURRENT = INTEGER OF (LOW + HIGH)/2
2. . COMPARE RECORD A TO RECORD(CURRENT)
2. . IF A LT B THEN
3. . . SET DIRECTION BIT OFF
3. . . SET HIGH = CURRENT - 1
2. . ELSE A GT B
3. . . SET DIRECTION BIT ON
3. . . LOW = CURRENT + 1
2. . ENDIF A LT B
1. ENDDO LOW LE HIGH
1. IF DIRECTION BIT OFF THEN
2. . CURRENT = CURRENT - 1
1. ENDIF DIRECTION BIT
1. OFFSET OF INSERTION POINT = CURRENT *
HEADER SIZE
END (BINARY SEARCH)
-END-PSEUDOCODE-
END RSOGNSOR
```

While only one embodiment of the invention, together with modifications thereof, has been described in detail herein and shown in the accompanying drawings, it will be evident that various further modifications are possible without departing from the scope of the invention.

We claim:

1. A method of qualifying and sorting file records from a mass storage means into a sort buffer memory for use in an office processing environment whereby the sort buffer memory provides a temporary retention of the file records in an order based on a selected ranking, comprising the steps of:
   (a) accessing each of said file records in said mass storage means;
   (b) evaluating an accessed file record in accordance with a chosen sort algorithm to determine if it qualifies for transfer to the sort buffer memory;
   (c) if the accessed file record qualifies, then comparing a rank of the qualified file record in the mass storage means with the rank of a lowest ranked file record in the sort buffer memory;
   (d) if the rank of the qualified file record is higher than the rank of the lowest ranked file record in the sort buffer memory, then the qualified file record is transferred to unused space in the sort buffer memory; and if the rank of the qualified record is lower than the rank of the lowest ranked file record, then the qualified file record is not transferred to the sort buffer memory if the buffer is full;
   (e) placing the qualified file record transferred to the sort buffer memory at a level based on the rank determined by the chosen sorting algorithm;
   (f) repeating steps (c)—(e) for each qualified file record in the storage means until the sort buffer has been loaded with the highest ranked records in the storage means without overflowing; and
   (g) outputting said highest ranked records from said sort buffer.

2. A method of qualifying and sorting file records as set forth in claim 1 wherein the step of evaluating an accessed file record to determine if it qualifies for transfer includes evaluating multiple fields of each file record.

3. A method of qualifying and sorting file records as set forth in claim 1 including the step of repeating steps (c)–(g) for the remaining qualified file records in the storage means.

4. A method of qualifying and sorting file records as set forth in claim 3 wherein the file records in the sort buffer are transferred to a disk storage.

5. A method of qualifying and sorting file records in a storage means into a sort buffer for temporary retention in an order based on a selected ranking, comprising th steps of:
   (a) accessing each of said file records in said storage means;
   (b) evaluating an accessed file record to determine if it qualifies for transfer to the sort buffer;
   (c) if said accessed file record qualifies, comparing a rank of the qualified file record in the storage means with the rank of a lowest ranked file record in the sort buffer;
   (d) if the rank of the qualified file record is higher than the rank of the lowest ranked file record, transferring the qualified file record in the storage means to the sort buffer;
   (e) deleting the lowest ranked file record from the sort buffer to facilitate storage of the qualified file record therein;
   (f) locating the qualified file record transferred to the sort buffer at a level based on the rank thereof; and
   (g) repeating steps (c)-(f) for each qualified file record in the storage means until the sort buffer has been loaded with the highest ranked records without overflowing.

6. A method of qualifying and sorting file records as set forth in claim 5 including the step of outputting the file records in the sort buffer after steps (c)-(g) have been repeated for each file record in the storage means for the highest ranked file records in the storage means not previously transferred to the sort buffer.

7. A method of qualifying and sorting file records as set forth in claim 6 including the step of repeating the outputting of file records from the sort buffer each time said buffer contains the highest ranked file records from the storage means not previously transferred to the sort buffer.

8. A method of qualifying and sorting file records as set forth in claim 7 including the step of transferring file records in the sort buffer to a disk storage.